Figure 3:
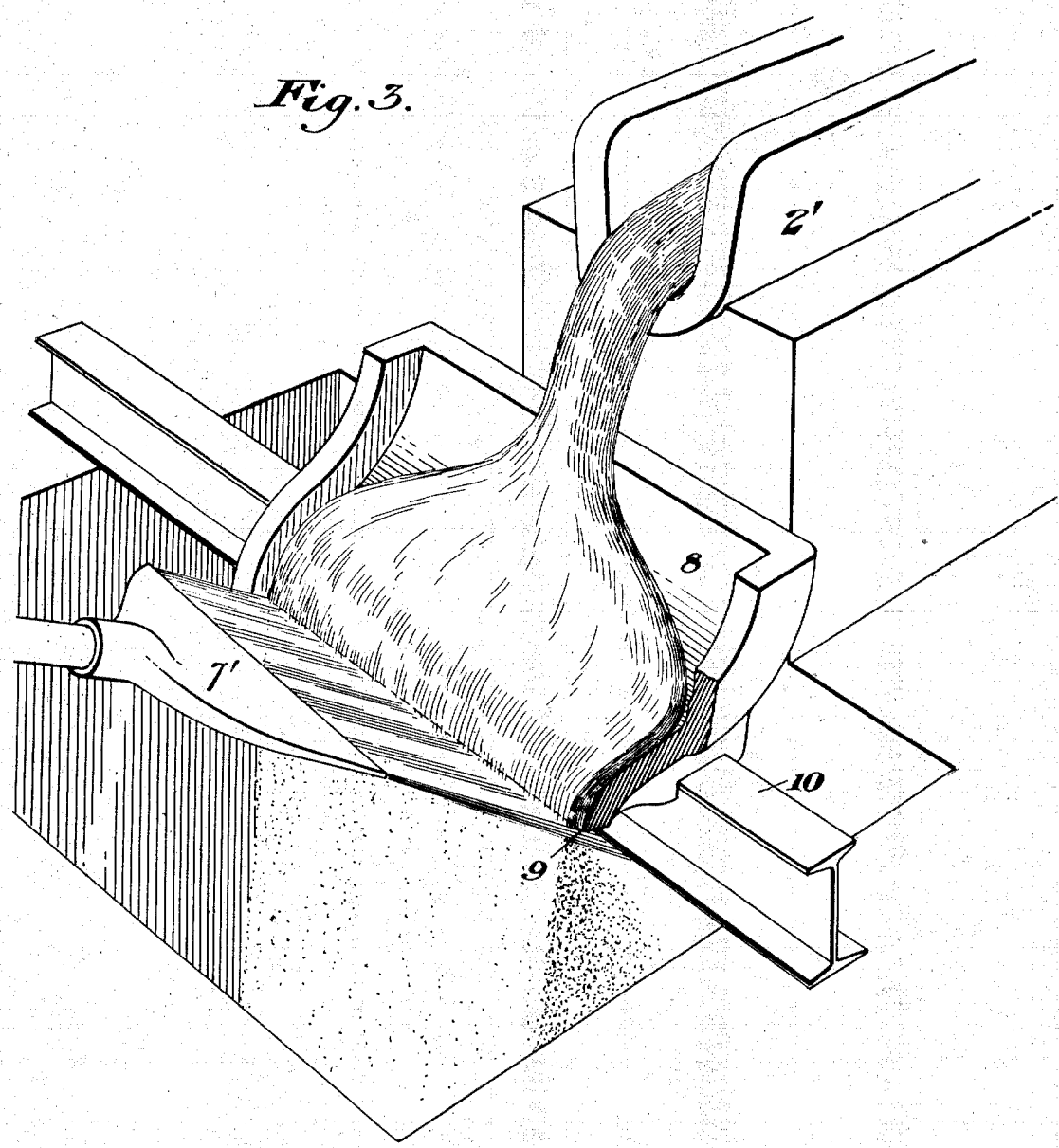

No. 777,388. PATENTED DEC. 13, 1904.
J. G. McDOWELL.
METHOD OF GRANULATING SLAG.
APPLICATION FILED DEC. 29, 1903.
NO MODEL. 2 SHEETS—SHEET 1.
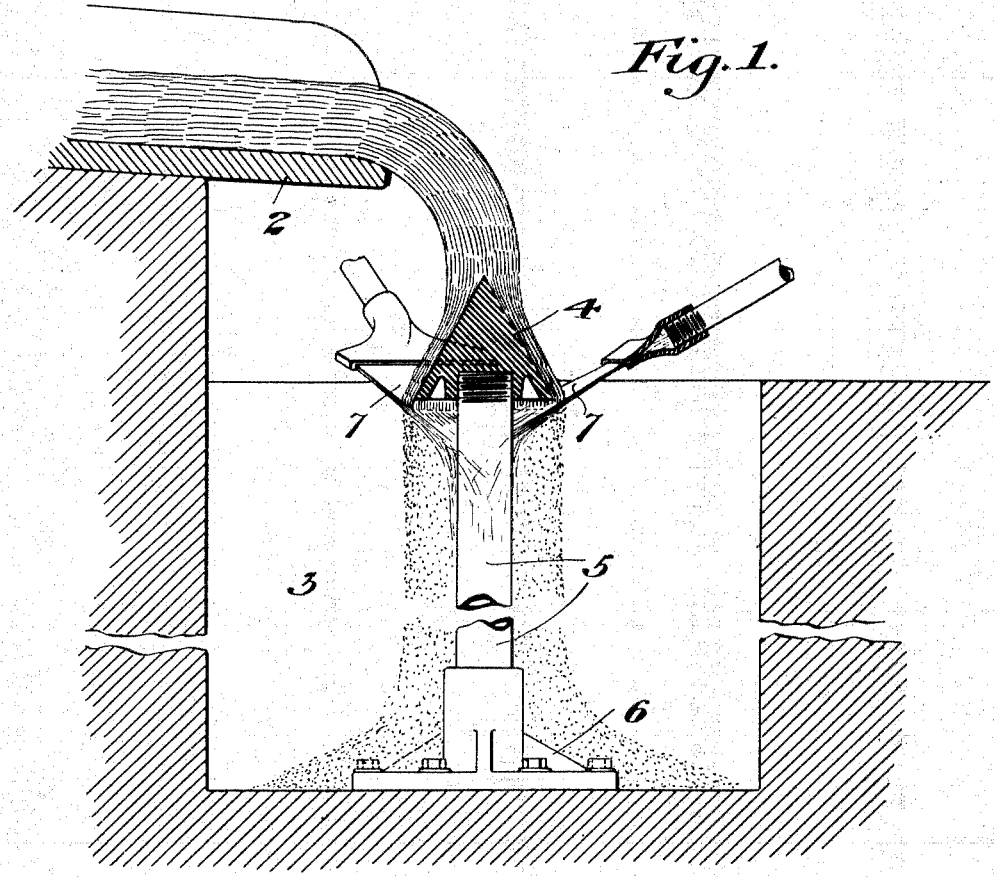
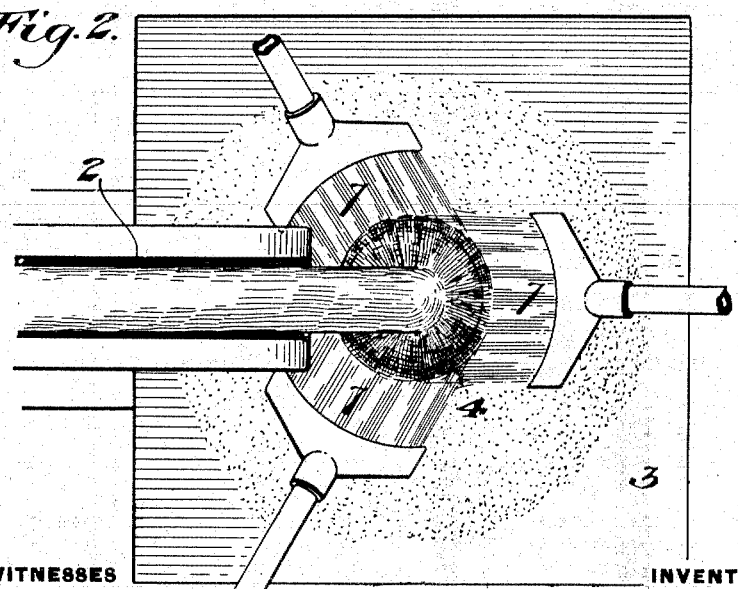
WITNESSES
INVENTOR No. 777,388.

Patented December 13, 1904.

UNITED STATES PATENT OFFICE.

JOHN G. McDOWELL, OF PITTSBURG, PENNSYLVANIA.

METHOD OF GRANULATING SLAG.

SPECIFICATION forming part of Letters Patent No. 777,388, dated December 13, 1904.

Application filed December 29, 1903. Serial No. 186,950. (No specimens.)

*To all whom it may concern:*

Be it known that I, JOHN G. McDOWELL, of Pittsburg, Allegheny county, Pennsylvania, have invented a new and useful Method of Granulating Slag, of which the following is a full, clear, and exact description, reference being had to the accompanying drawings, forming part of this specification, in which—

Figure 1 is a sectional side elevation showing one form of apparatus for carrying out my invention. Fig. 2 is a top plan view of the same, and Fig. 3 is a perspective view showing another form of apparatus.

My invention relates to the manufacture of slag-sand, which may be used as a substitute for ordinary river or pit sand; and the object of the invention is to act upon the stream of liquid slag in such a manner that the water jet or jets will act upon the same efficiently in granulating it.

To that end the invention consists in spreading the slag stream, and thereby producing a dropping sheet of slag, and then driving a water-jet, also preferably in the form of a sheet, against the dropping slag layer.

The invention also consists in splitting the stream of slag to spread it before acting upon it with the water, and, further, in the steps hereinafter described, and set forth in the claims.

In the drawings, referring to the form of Figs. 1 and 2, 2 represents a slag-spout of any suitable form leading from a pool or source of slag and overhanging a pit 3. In front of and below the spout is a splitter 4, which I have shown as of conical form carried upon a tubular support 5, rising from the bed-plate 6 at the bottom of the pit. The deflector 4 is so arranged that its apex will be approximately at the center of the dropping slag stream, and the slag is thus split into an annular sheet which drops from the edges of the cone. This fluid-slag sheet is then acted upon by water-jets 7, of which I have shown three, each preferably having a horizontally-flattened arc-shaped nozzle. These jets are spaced apart around the cone, and the jets of water under pressure preferably strike the slag sheet just below the edge of the cone. The nozzles are flattened for the purpose of causing the water to act upon the different parts of the slag. The number of these water-jets and the shape of the nozzles may, however, be varied widely without departing from my invention.

In carrying out my process the slag is allowed to flow through the trough and drop upon the cone, which splits it into the annular-sheet form. The jets of water are then driven against this sheet, thereby converting the slag into granulated form of comparatively small-sized particles, the particles dropping into the bottom of the pit, whence they may be lifted in any suitable manner. The pit may be provided with a suitable overflow for the water.

In the form of Fig. 3 instead of a splitting device I show a spreader 8. This spreader in the form shown consists of a casing having a curved or concave inner face, upon which the slag stream drops from the trough 2'. The stream is thus spread out horizontally and drops from the edge 9 of the deflector in sheet form. The spray-nozzle 7' may be the same as before, except that its edge is preferable straight and parallel with the edge of the deflector. The deflector may be supported upon I-beam 10, extending across the pit, or in any other suitable manner.

The advantages of my invention result from the efficient action of the water due to the spreading of the slag into sheet form. The water is thus enabled to act upon the different portions of the slag stream more efficiently than where the stream drops in normal shape. I am thus enabled to obtain a larger percentage of sand of the proper-sized particles, and hence increase the output and diminish the cost.

Many variations may be made in the form and arrangement of the spreading or feeding devices and the other parts without departing from my invention.

I claim—

1. The method of treating liquid slag consisting in spreading a stream of fluid slag into sheet form and then driving a liquid against the slag sheet; substantially as described.

2. The method of treating liquid slag consisting in splitting a stream of fluid slag into sheet form and driving liquid jets against the split portions of the stream; substantially as described.

3. The method of treating liquid slag consisting in splitting a fluid-slag stream into sheet form and driving flattened jets of water against the different portions of the split stream; substantially as described.

4. The method of treating liquid slag consisting in spreading a stream of fluid slag into sheet form and then driving water against the slag sheet after spreading and while dropping freely through the air; substantially as described.

In testimony whereof I have hereunto set my hand.

JOHN G. McDOWELL.

Witnesses:
　JOHN MILLER,
　H. M. CORWIN.